United States Patent [19]

Dickerson

[11] Patent Number: 5,476,285
[45] Date of Patent: Dec. 19, 1995

[54] SUSPENSION SYSTEM AND BODY FOR LARGE DUMP TRUCKS

[75] Inventor: Alan W. Dickerson, Mount Eliza, Australia

[73] Assignee: BHP Australia Coal PTY Ltd A.C.N., Queensland, Australia

[21] Appl. No.: 39,381

[22] PCT Filed: Aug. 26, 1991

[86] PCT No.: PCT/AU91/00389

§ 371 Date: Apr. 23, 1993

§ 102(e) Date: Apr. 23, 1993

[87] PCT Pub. No.: WO92/04196

PCT Pub. Date: Mar. 19, 1992

[30] Foreign Application Priority Data

Sep. 3, 1990 [AU] Australia .................. PK2104

[51] Int. Cl.$^6$ ................. B62D 21/00; B62D 61/00
[52] U.S. Cl. ............... 280/781; 298/22 R; 296/182; 280/688; 180/24.08
[58] Field of Search ................ 280/109, 110, 280/117, 126, 702, 81.1, 688, 713, 725; 180/22, 24.08; 298/175, 22 R; 296/184, 182

[56] References Cited

U.S. PATENT DOCUMENTS

| | | | |
|---|---|---|---|
| 2,674,489 | 4/1954 | Maxon, Jr. ................. | 298/22 R |
| 3,552,798 | 1/1971 | Cole et al. ................. | 298/22 R |
| 3,773,348 | 11/1973 | Davis . | |
| 3,840,244 | 10/1974 | Gee et al. ................ | 280/688 |
| 3,897,972 | 8/1975 | Logue . | |
| 3,940,163 | 2/1976 | Davis et al. . | |
| 4,071,277 | 1/1978 | Stedman ................. | 280/173 |
| 4,270,786 | 6/1981 | Mattox ................. | 298/22 R |
| 4,927,173 | 5/1990 | Clifton, Jr. ............... | 280/688 |

FOREIGN PATENT DOCUMENTS

| | | |
|---|---|---|
| 1145351 | 10/1957 | France . |
| 2830450A1 | 2/1979 | Germany . |
| 3434297A1 | 3/1986 | Germany . |
| 62-34828 | 2/1987 | Japan ................. 296/184 |
| 374556 | 2/1964 | Switzerland . |
| 954178 | 4/1964 | Switzerland . |
| 383792 | 1/1965 | Switzerland . |
| 416346 | 1/1967 | Switzerland . |
| 963370 | 7/1964 | United Kingdom . |

OTHER PUBLICATIONS

Derwent Abstract Accession No. B7994/D09.
Patent Abstracts of Japan, M–72, p. 132, JP,A,56–34574.

*Primary Examiner*—Karin L. Tyson
*Attorney, Agent, or Firm*—Nikaido Marmelstein Murray & Oram

[57] ABSTRACT

A suspension system for the main frame of a large dump truck has laterally spaced frame members each associated with a wheel mounting hub. For each hub, a hollow forward attachment arm is supported by a bearing block having a longitudinal journal and a transverse journal. The longitudinal journal receives the attachment arm and the transverse journal receives the ends of a shaft rigidly secured to the frame members and extends therebetween to define a cross member. A vertically compliant suspension strut includes a cylinder rigidly attached to a support secured to the frame member and receives a piston attached to a rear extension from the hub via a bearing which allows each hub to rotate about longitudinal and transverse axes relative to the respective frame member. Also disclosed is a dump truck body having side walls, a floor and an end wall. The floor is reinforced by longitudinal reinforcing beams and by only one transverse beam. The side walls slope inwardly, the floor slopes downwardly and forwardly and the width of the floor increases towards the rear of the body.

48 Claims, 7 Drawing Sheets

SUSPENSION SYSTEM AND BODY FOR LARGE DUMP TRUCKS

FIELD OF THE INVENTION

This invention relates to suspension systems and configurations for the main structural components of very large trucks of the type used in mining operations.

BACKGROUND OF THE INVENTION

There is much commonality between currently available large mining trucks made by different manufacturers and the following observations are generally applicable regardless of the truck manufacturer:

The empty vehicle weight is a high proportion of the maximum gross vehicle weight. Typically the ratio of payload to empty vehicle weight is only about 1.4:1. This means that much of the cost of operating such trucks is related to moving the empty vehicle weight rather than the payload.

The total width of the four rear tires is large compared to the total width of the truck. Typically 65% of the total width of a truck is taken up by the four rear tires. With present designs of truck this leads to a very narrow main frame for the truck and very high bending loads on the rear axle and rear wheel support systems. The narrow main frame causes shortage of space for maintenance of some components, high stress changes during cornering maneuvers, the need for vertically stiff rear suspension springs and design restrictions on the body. The net effect is high weight and cost for the main frame, the rear axle, the rear wheel support assemblies and the body.

The travel of the rear suspension system of a fully loaded truck is very limited compared to the scale of the truck. Typically the maximum travel in the compression direction of the rear axle relative to the main frame is only of the order of 50 mm when loaded. This limited travel is a result of the need to achieve adequate roll stiflenets from the two narrowly spaced rear spring units.

The main frames of these trucks are complex welded steel structures that are heavy (e.g. 16.5 tons for the main frame of a truck with a payload rating of 172 tons), expensive to design, develop and manufacture, and prone to fatigue cracking.

The main load carrying member (the body) of the trucks is a very strong and generally stiff member. This strength and stiffness is a consequence of the need for the body to withstand the shock loads applied during loading of large rocks by large excavators.

The body is generally supported from the main frame of the truck at numerous points. For example at the rear pivot points, at two, four, six or eight points along the underside of the body and in some trucks also at forward extensions of the body which contact the main frame at points which are close to being above the line of the front wheels. This system of supporting the stiff body causes high variation of stress levels in the main frame of the truck and the body as the truck traverses over uneven ground. This feature causes fatigue problems, high design and fabricating costs and the need for considerable expenditure to limit the unevenness of the ground on which the trucks travel.

The body is tipped (hoisted) by hydraulic cylinders which react against the main frame of the truck at points near to midway between the front and rear wheels. This causes very large bending loads to be applied to the main frame of the truck and requires that the main frame be very massive at the mid sections. It can also cause large stress changes in the body.

The dual rear tires are rotationally locked together. During short radius turning maneuvers (frequent occurrences in typical mining operations), this causes severe scrubbing type wear of the tires due to the differential travel distance effect. Relative scrubbing between the two tires of a dual set is considered to contribute significantly to total wear of rear tires on large mining trucks.

The combination of four wide tires on a solid beam axle type rear axle causes large variations in individual tire loads as the trucks traverse uneven ground conditions. This arrangement also means that it is necessary to take considerable care in matching tire outside diameters and inflation pressures to minimise the unevenness in tire loads on level ground conditions.

In general with currently available truck designs, the transfer of forces between the body and the ground is through a very indirect path which involves high bending loads in the body, the main frame of the truck, the rear axle housing and the rear wheel support systems (the final drives or the wheel motor housings). Furthermore these bending loads fluctuate greatly as the truck travels over uneven ground and during cornering.

Figure 1:
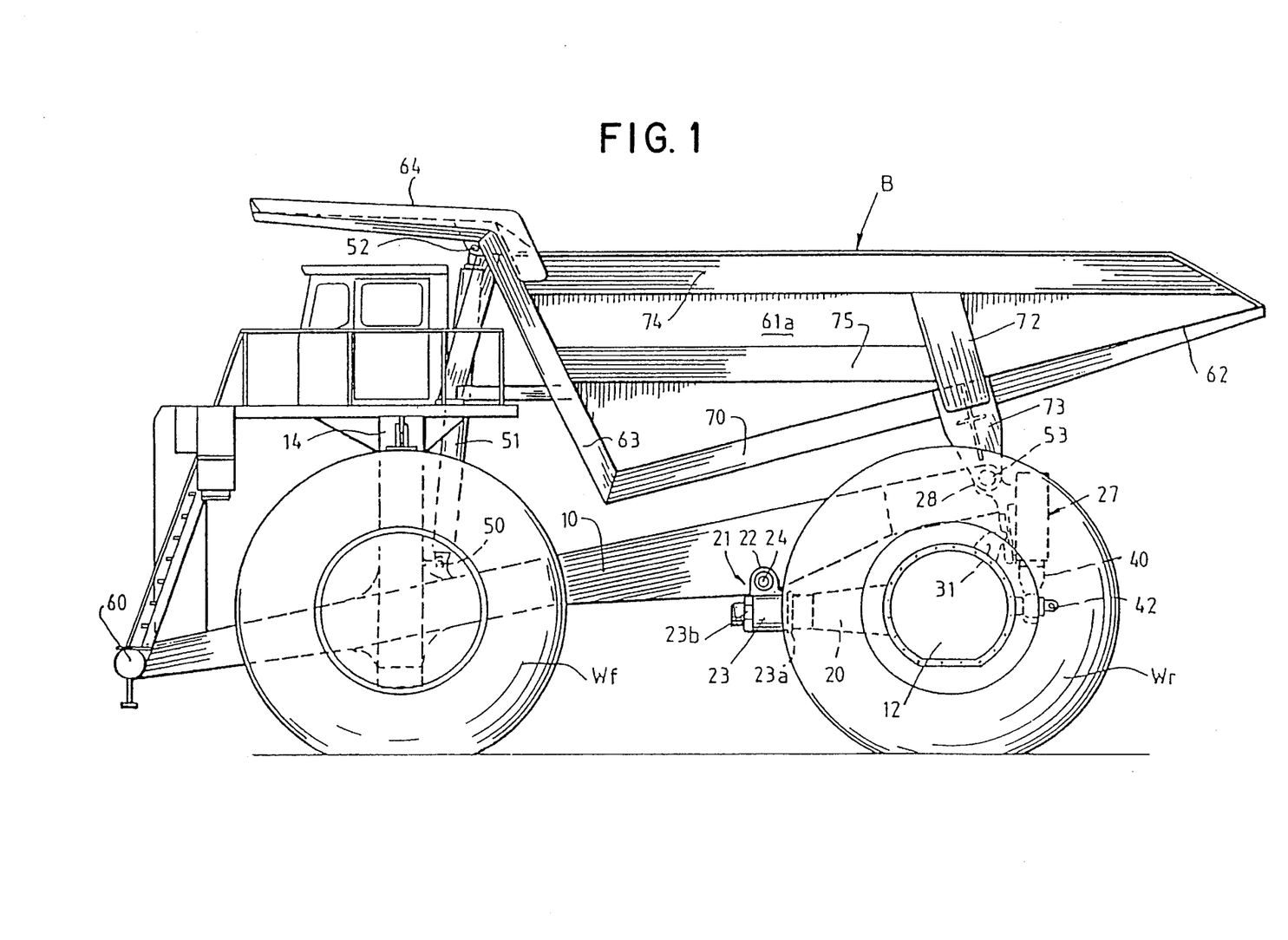
FIG. 1 is a side elevation of a truck incorporating an embodiment of the invention.

A typical very large mining truck is shown in FIG. 1 of the drawings of our co-pending International Patent Application No. PCT/AU90/00084, and it will be noted that the frame structure is quite substantial and this results from the frame being required to bear the load supported by the body of the truck by contact between the body and the upper surfaces of the frame, and by virtue of the body hoisting rams being connected to the frames as shown. The substantial size of the rear axle is also apparent.

While many truck frame design improvements have been suggested over the years, no one design has successfully addressed more than a few of the difficulties which have been outlined above. For example, U.S. Pat. No. 3,704,040 Davis et al discloses a frame arrangement in which the front and rear wheel pairs are centrally supported, the independent frame members arrangement which is described as addressing many of the problems created by uneven terrain is extremely complex and consequently expensive and heavy. This patent and the related U.S. Pat. No. 3,773,348 also disclose a rear suspension arrangement suitable for use with centrally supported rear wheel pairs. Centrally supported rear wheel pairs provide the potential to overcome some of the problems inherent in currently available large mining trucks, but to date no successful method of exploiting this potential has been established.

In addition to the above, most truck body designs have remained essentially unchanged for many years, being characterized by extremely heavy structures reinforced by means of relatively closely spaced transverse beams assisted by limited longitudinal beams, thereby resulting in a body structure of extremely high weight.

Similarly, most conventional truck bodies have a sloping floor and vertical longitudinal sides arranged at a constant width spacing. In one departure from this approach, a body having a flat floor and vertical sides which are wider apart at the rear of the body than at the front of the body was designed. Although in this arrangement, the wear on the sides of the body is reduced, the flat body floor is not compatible with most truck main frame designs and it increases the height of the center of gravity of the truck unless the overall width and/or length of the truck is increased.

SUMMARY OF INVENTION AND OBJECTS

It is an object of the present invention to provide an improved configuration for a very large vehicle in which at least some of the problems outlined above are ameliorated.

In one aspect the invention provides a suspension system for a very large vehicle, comprising a substantially rigid main frame having a forward section carrying front wheels and a rear section, the rear section being substantially rigidly attached to the front section and including spaced frame members each associated with a wheel mounting hub, each hub independently supporting a pair of rear wheels one on either side of the hub. The suspension system comprises a forward attachment means for the hub pivotally mounted on the frame members to allow limited rotation of the hub about a longitudinal and a transverse axis relative to each frame member, and a vertically compliant suspension means limiting rotation of the hub about said transverse axis. The suspension means is rigidly attached to the frame member to prevent lateral movement of the hub in the transverse plane relative to said frame member and is actively coupled to the hub in a manner which allows longitudinal movement of the hub relative to the suspension means as the hub rotates about the transverse axis and to permit rotation of the hub about said longitudinal axis.

In a preferred form, the invention provides that the main frame forward section is narrow and extends between the front wheels, the rear section being wider than the front section, the spaced frame members including elongate frame portions which extend gradually inwardly from the wider rear section to said narrower front section such that the transition between the front and rear sections is gradual rather than abrupt.

The forward attachment means is preferably, pivotally mounted on mounting means extending laterally outwardly from the frame members, the main frame further comprising a cross member extending between the spaced frame members and substantially rigidly secured thereto to increase the rigidity of the rear frame section in the region of the mounting means for the forward attachment means.

The cross section preferably comprises a shaft passing through portions of the frame members and having end portions extending laterally outwardly from said frame members to provide the mounting means for the forward attachment means.

The forward attachment member may be substantially tubular and the pivotal mounting may have a passage through it to convey cooling air to electric traction motors supported by the rear wheel mounting hub.

In another aspect of the invention there is provided a large vehicle comprising a suspension system as defined above, a substantially rigid load supporting body, means for pivotally mounting the body with respect to the main frame, and means for maintaining transverse spacing between the rear wheel pairs.

By providing the principal reinforcement of the body by means of longitudinally extending strengthening beams, the necessary body strength can be achieved with significant reductions in the weight and the manufacturing cost of the body.

The body is preferably pivotally mounted on the main frame of the truck such that pivotal movement of the body is about an axis which lies within the profile of the rear wheel pairs. The body is preferably supported only at the pivot points and at one or two points near the front of the body, these forward support(s) lying close to above the line between the center of the front wheels of the truck. The hydraulic cylinder(s) used for tipping the body about its pivot points preferably react onto the main frame of the truck at one or two points which are also close to above the line between the center of the front wheels of the truck. By these means the body is prevented from exerting large bending moments in the main longitudinal members of the main frame of the truck. The forward body supports may include a positive location system between the body and the main frame of the truck so that the body can provide a significant proportion of the strength that is required between the front and rear wheels when it is in the 'down' position.

The use of rear wheel mounting hubs positioned between each pair of wheels suits the use of electric motor systems to drive the rear wheels. The use of such motors has the inherent advantage of enabling the problems associated with a solid rear axle to be easily overcome thereby reducing the weight of the rear wheel supporting systems, improving load sharing between the rear tires and reducing the rear tire wear effects of such axles. However, mechanical drive systems may be utilized with acceptable results. Advantages may be taken of the rear wheel mounting arrangement to incline one or both of the wheels which are mounted on the hub at an angle other than vertical so as to improve the stability of the vehicle during cornering maneuvers and when operating on cross (transverse) slopes. The location of the rear wheel mounting hubs between each pair of wheels allows independent rotation of each wheel thereby avoiding tire wear caused by short radius turning.

In another aspect, the invention provides a load carrying body for a large vehicle comprising a floor reinforced by strengthening beams, side walls and an end wall defining a load carrying region, characterized in that a substantial majority of the strengthening beams extend longitudinally of the body.

In a preferred form of this aspect of the invention, the body is reinforced by only one substantial strengthening beam extending transversely of the vehicle, preferably in the region of a pivot attachment means for pivoting the body with respect to a truck. The body preferably also has longitudinal strengthening beams in the side walls, and the traverse beam also preferably extends into the side walls.

In another aspect of the invention, there is provided a load carrying body for a large vehicle, comprising a floor, side walls and an end wall defining a load carrying region, the floor sloping downwardly in the forward longitudinal direction of the body, said side walls sloping inwardly towards the floor, and the floor increasing in width towards the rear longitudinal direction of the body.

A truck body having the above combination of features has the necessary low center of gravity and the sloping side walls and the increasing width of the body floor facilitates easier discharge of a load while minimizing wear on the sides of the body.

BRIEF DESCRIPTION OF THE DRAWINGS

The foregoing and other features, objects and advantages of the present invention will become more apparent from the following description of the preferred embodiment and the accompanying drawings in which.

DESCRIPTION OF PREFERRED EMBODIMENT

Referring to FIGS. 1 to 5 of the drawings, the truck frame comprises a pair of relatively light longitudinal members 10 and 11 suspending rear wheel mounting hubs 12 and 13 towards their rear ends. The longitudinal members 10 and 11 are connected at their forward ends by a substantial cross member 14, such as a mounting collar which generally includes mounting points for the front suspension (not shown) for the front wheels W, at the front by a bumper 60 and at the rear, forwardly of the rear wheels, by a cross member 60a, which forms part of the support means for the rear wheel mounting hubs 12 and 13, as will be described further below. The front suspension may take the form described in greater detail in our co-pending International Patent Application No. PCT/AU90/00084, or in any other suitable form.

Figure 3:
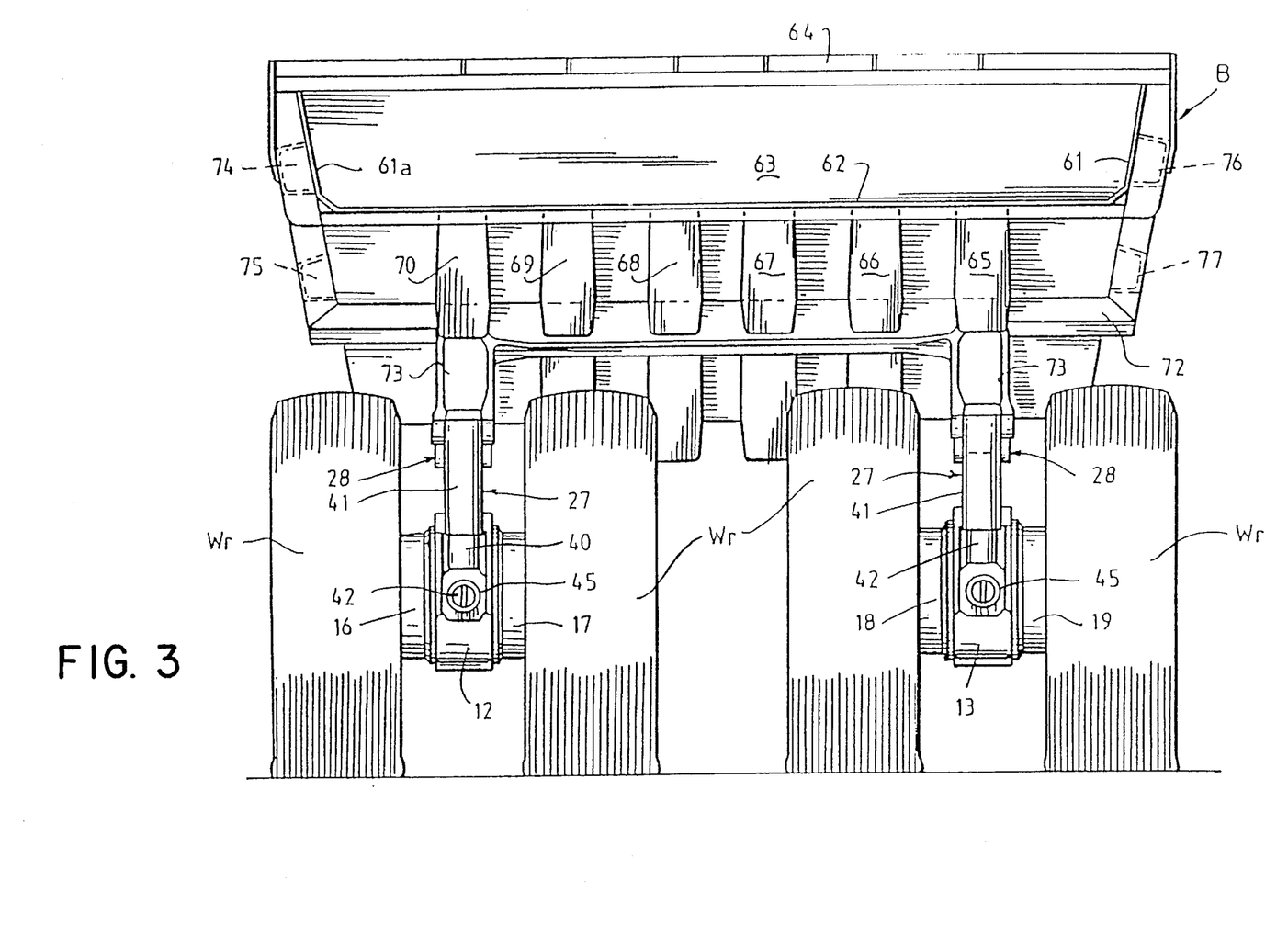
FIG. 3 is a rear end elevation of the truck of FIG. 1 showing details of the rear suspension and partly illustrating the improved truck body construction.
Figure 4:
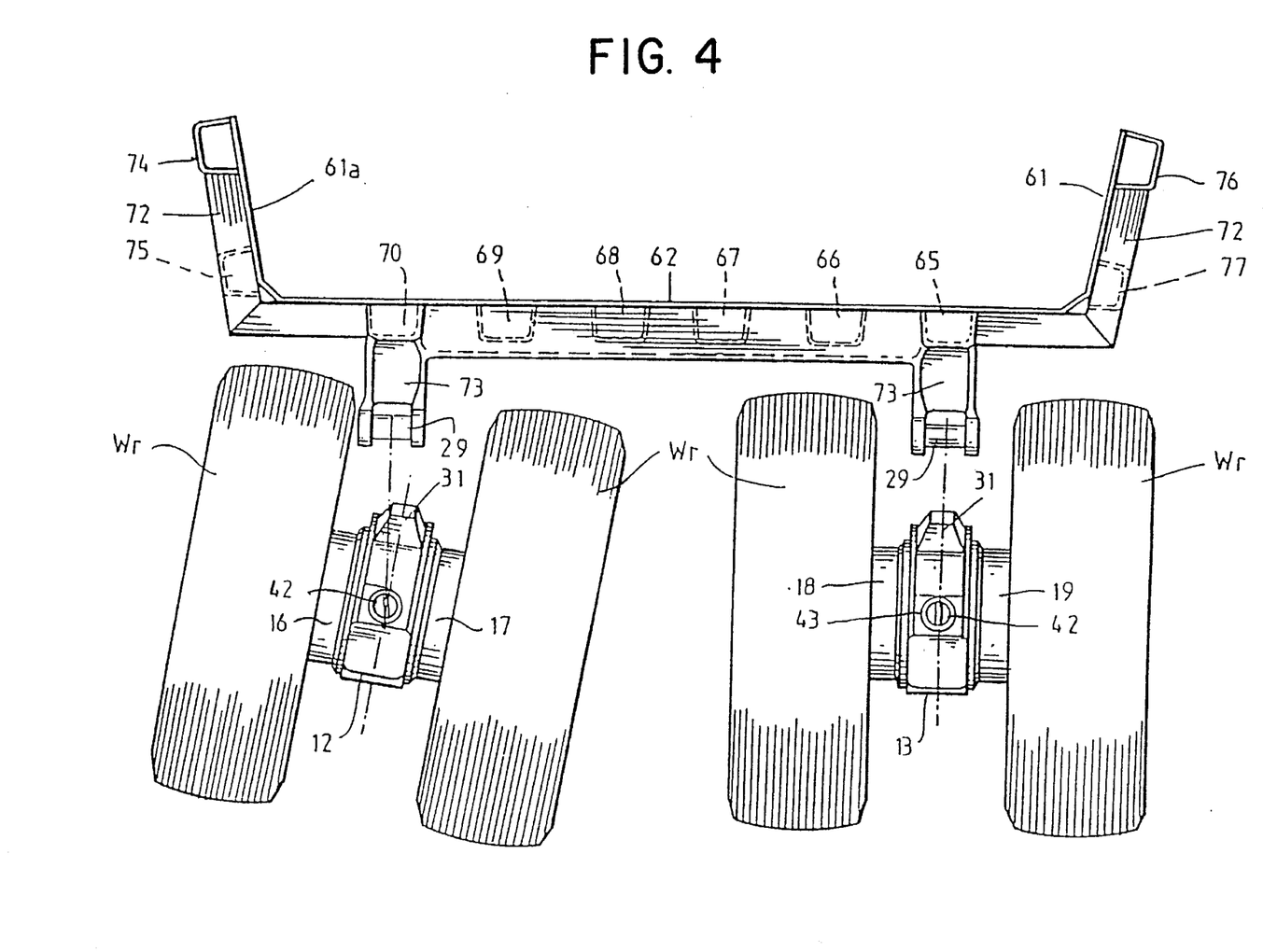
FIG. 4 is a fragmentary sectional end elevation with parts removed to show the extent of transverse rotation of one of the two rear wheel mounting hubs in one direction.
Figure 5:
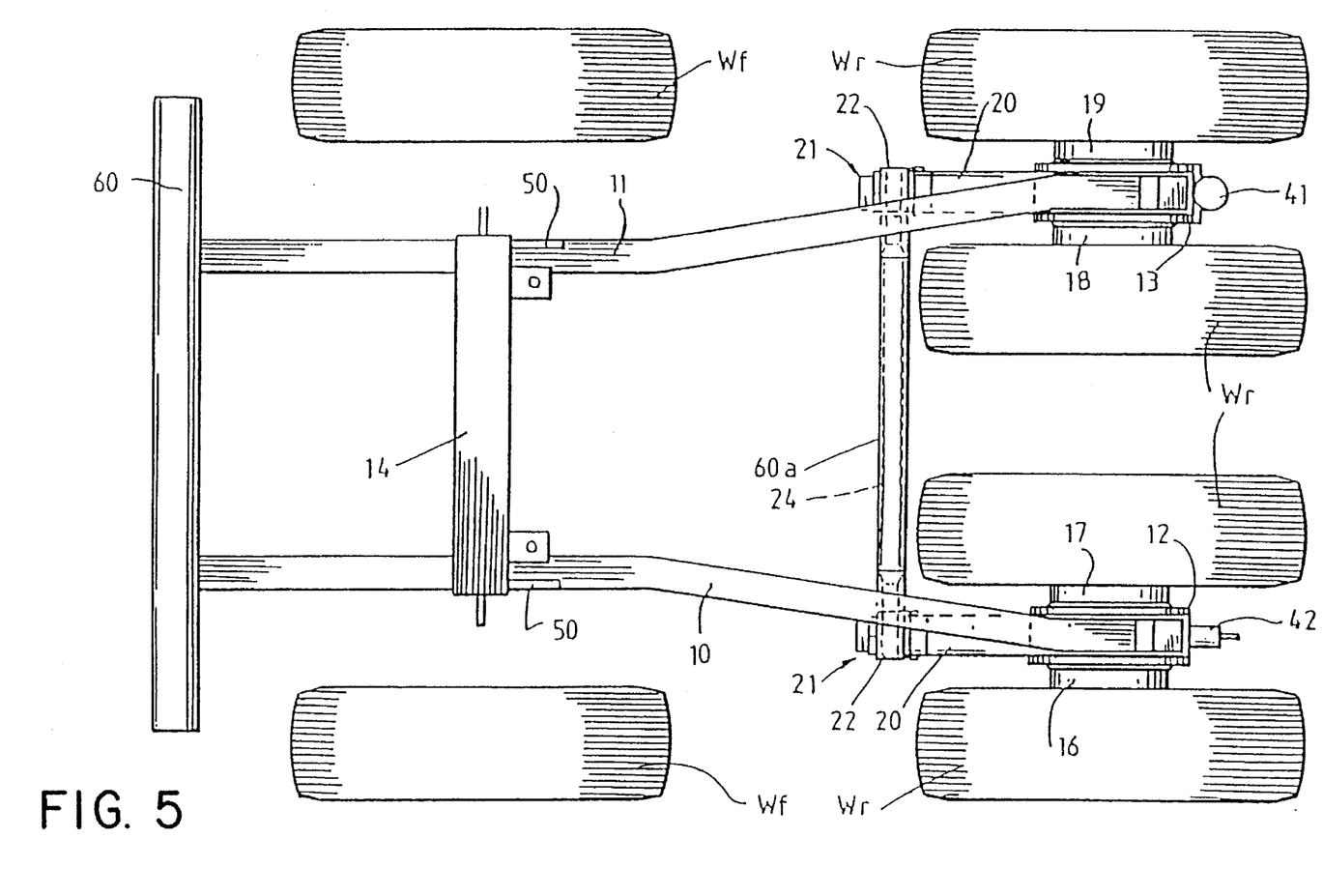
FIG. 5 is a fragmentary plan view of the truck frame with the body removed.

As shown in FIGS. 3, 4 and 5, the wheel mounting hubs 12 and 13 support drive means for the rear wheels $W_r$, such as electric traction motors 16, 17, 18 and 19, which are in turn connected to the reap wheels $W_r$, with each wheel being mounted one on either side of the hubs 12 and 13. The location of the reap wheel mounting hubs 12 and 13 between each pair of rear wheels $W_r$ allows independent rotation of each wheel thereby avoiding tire wear caused by short radius turning.

The rear suspension system includes rear wheel mounting hubs 12 and 13 mounted to the longitudinal frame members 10 and 11 by means of hollow forwardly extending attachment members 20 which are attached to pivotal mountings 21 which are in turn pivotally secured to a cross member 60a which is rigidly secured to the frame members 10 and 11. The attachment members 20 and the rear wheel mounting hubs 12 and 13 may be formed separately or as an integral unit, and the hollow attachment members 20 operate to convey cooling air to the motors 16 to 19 attached to the hubs 12 and 13.

Figure 2:
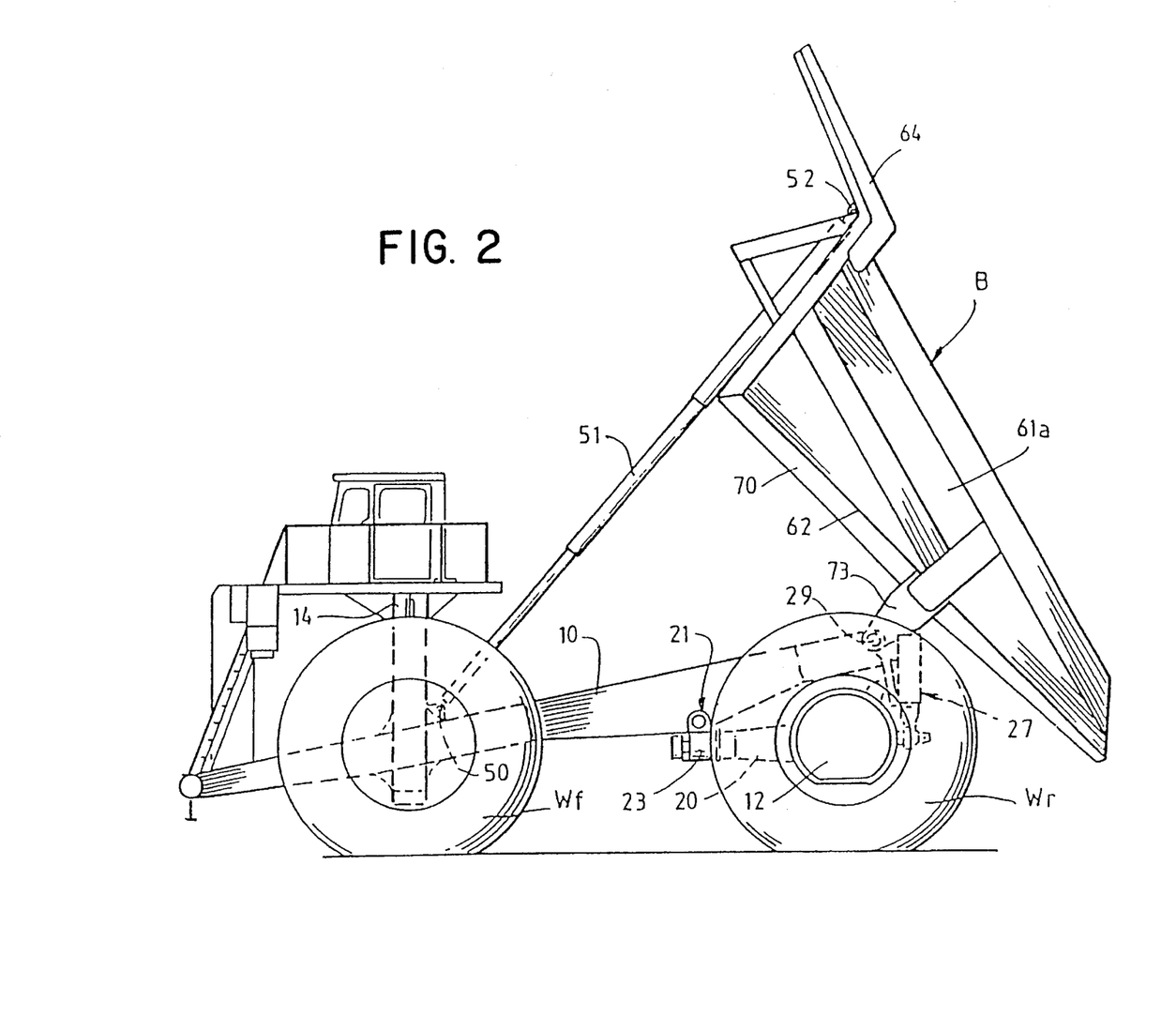
FIG. 2 is a side elevation similar to FIG. 1 with the truck body elevated.
Figure 6:
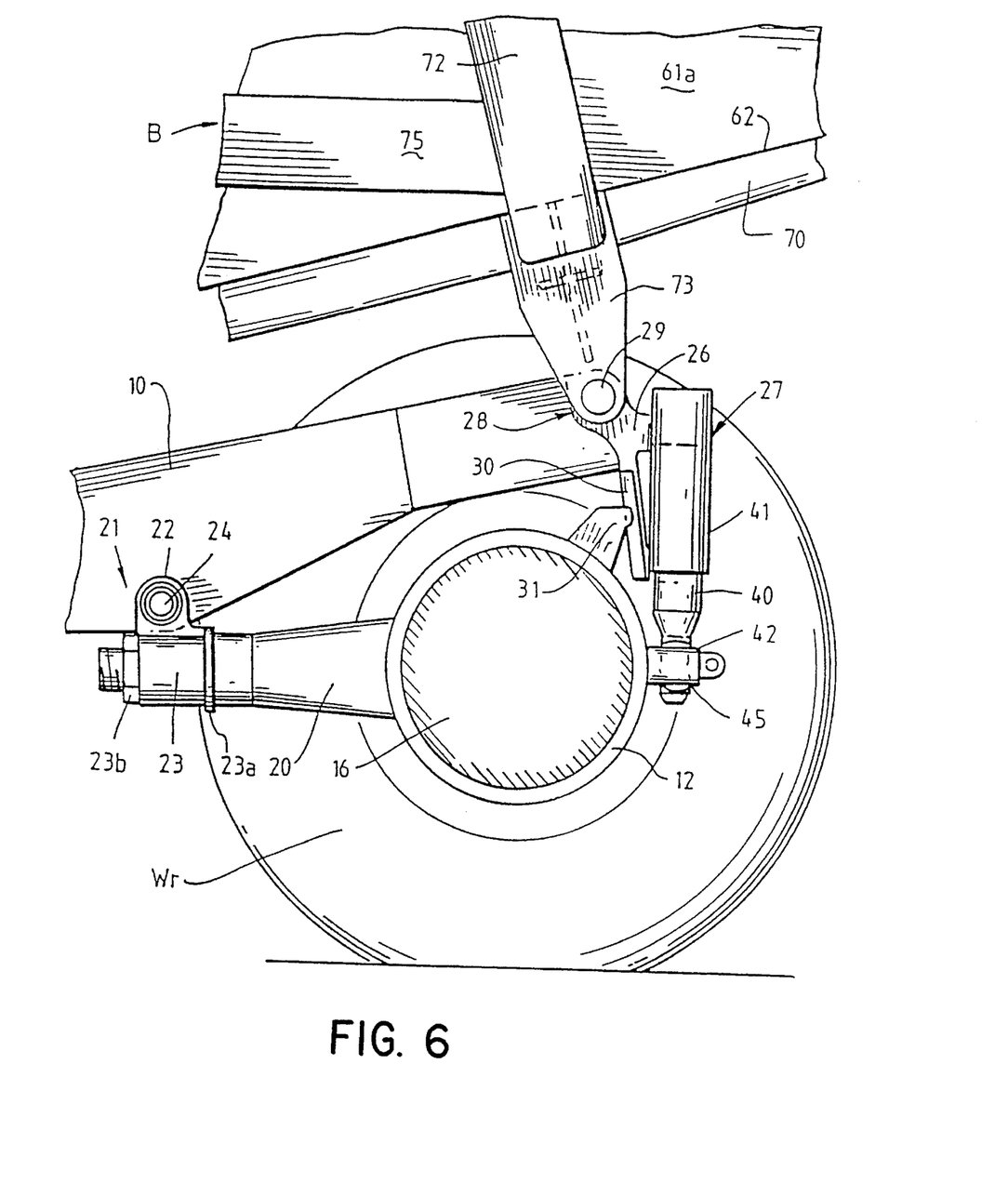
FIG. 6 is an enlarged sectional side elevation of one rear wheel mounting and suspension.

Each pivotal mounting 21 includes a top transverse journal 22 and a bottom longitudinal journal 23 which allow two rotational degrees of freedom for the hubs 12 and 13. The transverse journal 22 engages spindle sections on the ends of a shaft 24 (FIG. 5) which forms part of the rear cross member 60a for the frame members 10 and 11, which, as shown in FIGS. 1 and 2, are of increased depth in this region to allow the cross member 60a to penetrate the side plates of the frame members 10 and 11, to which the cross member 60a is rigidly secured in some suitable manner. Each lower journal 23 receives the end portion of one of the attachment members 20, within which journal 23 this end portion is free to rotate, the end portion of the attachment member 20 being restrained within the journal by a flange 23a formed on the attachment member 20 and a nut 23b engaging the end portion of the attachment member 20, as shown most clearly in FIG. 6 of the drawings.

The frame members 10 and 11 also carry a mounting member 26 for vertically compliant suspension means or spring unit 27, the mounting member 26 also having an integrally formed journal 28 which receives pivot pins 29 about which the body B of the truck pivots. The spring unit 27 includes a cylinder housing 41 rigidly attached to the mounting means 26 and receiving a piston unit 40 which is fixed to the mounting hubs 12, 13 by a rearward extension 42. The spring effect may be obtained by the compression of a gas within the cylinder or by other suitable means.

The mounting means 26 has downwardly extending rigid flanges 30 which are adapted to be engaged by an abutment 31 extending from each hub 12, 13 at a position closely adjacent the flanges 30 whereby transverse rotation of the hubs 12 and 13 is limited.

Rotation of the attachment member 20 and its connected hub 12, 13 in the other direction is confined by the cylinder of the spring means 27 to be along the axis of the cylinder 27, and the attachment point of the piston 40 to the rearward extension 42 is allowed by a spherical sliding bearing 45 between the piston 40 and the rearward extension 42.

The above described coupling and spring unit for the rear wheel mounting hubs 12 and 13 allows the hubs 12 and 13 to pivot about both longitudinal and transverse axes to facilitate greater flexibility in the movement of each hub 12, 13 with respect to the frame and truck body B. One such movement is illustrated in FIG. 4 of the drawings.

While the above described suspension system is suitable for trucks having frames of the type described above, or of the type otherwise described in our copending International Patent Application No. PCT/AU90/00084, it should be appreciated that the suspension system is equally applicable to other forms of truck having independent rear axles supported in a different manner to that described above.

Figure 7:
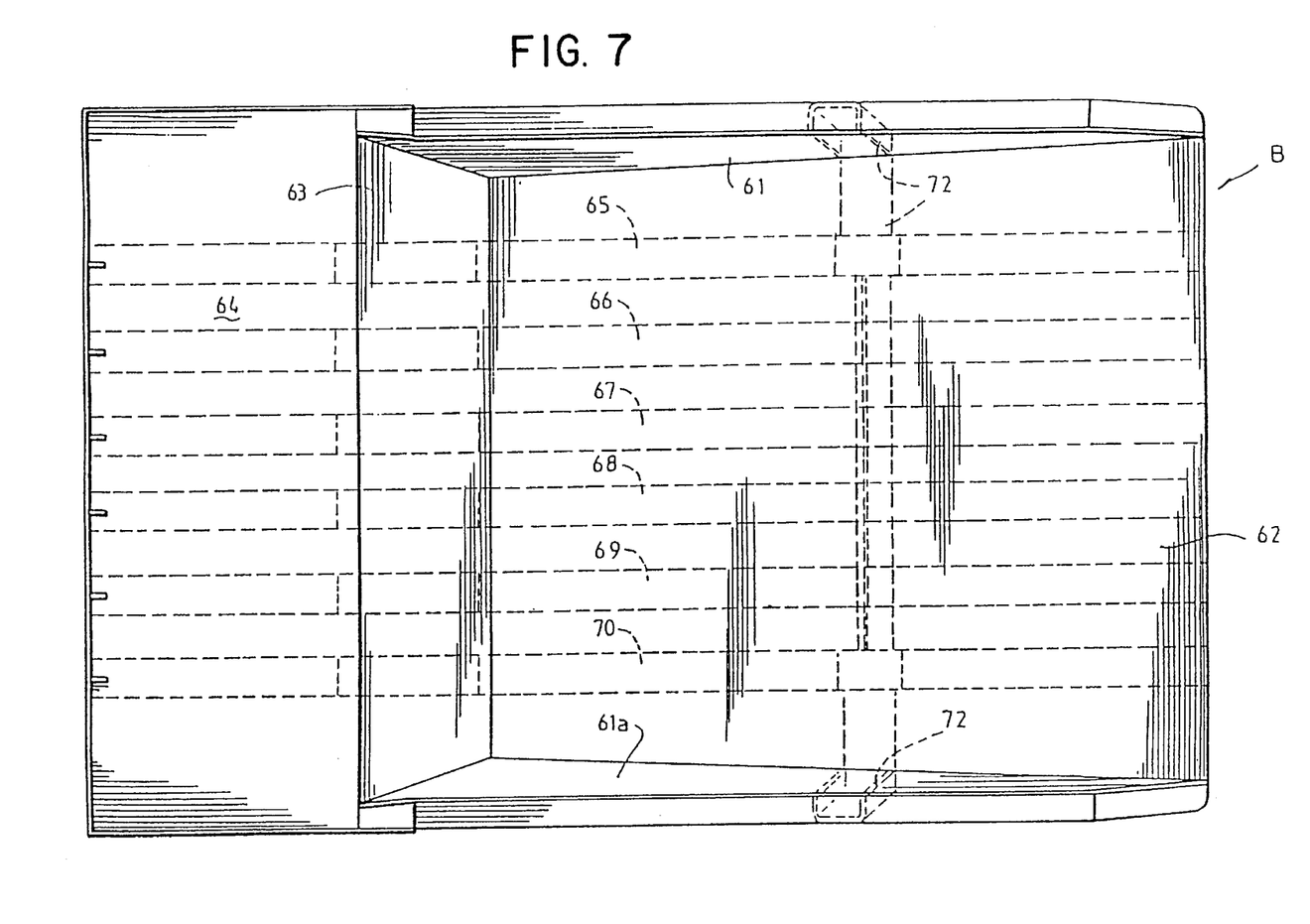
FIG. 7 is a plan view of the truck body showing its improved construction.

Referring additionally to FIG. 7 of the drawings, the truck body B according to a particularly preferred embodiment comprises side walls 61a and 61, a floor 62, a front wall 63 and a forwardly extending cabin-protecting extension 64. The truck body B has a number of novel features, including that the main reinforcing beams under the floor 62, front wall 63 and extension 64 extend longitudinally of the body, as shown at 65 to 70, and only one transverse reinforcing beam 72, located close to or on a line between brackets 73 formed to receive the pivot pin 29 engaging the journals 28, as previously described. Two additional beams 74, 75 and 76, 77 extend along each side 61a and 61 as shown most clearly in FIG. 3 of the drawings. Similarly, the cabin cover 64 will be seen to have the smallest strengthening beams as shown in FIG. 3. The transverse beam 72 extends the full width of the floor 62, and preferably extends up the sides 61a, 61 of the body as shown.

As mentioned earlier in this specification, conventional truck body designs rely on numerous transverse beams, and generally only two longitudinal beams running above the main frame of the truck or along the sides of the body floor. The principal advantages of the new body design described above include a significant reduction in the body weight, and a significant reduction in the manufacturing cost of the body, the body still having sufficient strength to allow it to be supported only at the front and at the body pivots, thereby allowing the weight and cost of the main frame of the truck to be reduced as described in greater detail in our co-pending International Patent Application No. PCT/AU90/00084.

In addition to the above, the floor 62 and the sides 61a and 61 are sloped in the manner shown in FIGS. 1, 3, 4 and 7 of the drawings whereby the width of the floor 62 of the body B increases from the front of the body to the rear of the body, as shown most clearly in FIG. 7 of the drawings. The advantage of this design feature is that wear on the sides of the body is reduced, because when the body is raised to the tipping position as shown in FIG. 2, the load slides into a widening space, rather than being confined to a constant width as for a conventional body design. Furthermore, the weight of the body can be reduced and there is no increase of the overall width of the truck.

As described in our earlier International patent application referred to above, the body is elevated by a pair of extendible rams 51 carried by mounting points 50 on the frame cross member 14 and at 52 on the truck body B.

It will be appreciated that the truck body features described in greater detail above are equally applicable to trucks of designs other than the design described in greater detail above.

Details of the attachment of the traction motors 16 to 19, the front wheel assemblies, the engine and the construction of the truck ancillaries including the driver's cab has not been included in this specification since each of these items can be of relatively standard construction and is within the existing knowledge of a person of skill in the art. It will, however, be noted that the rear axles are independent short axles with one tire on either side. While the three cross members 14, 61a and 61 provide substantial strength and rigidity between the two main longitudinal members of the main frame, means to maintain the transverse spacing of the frame members 10 and 11 is also provided to a significant extent by the direct attachment of the body B to the longitudinal frame members at the pivot mounts 73. This use of the inherent strength of the body B enables a further reduction in the frame strength, weight and cost.

I claim:

1. A very large vehicle, comprising:
   a substantially rigid main frame having a forward section carrying front wheels and a rear section, said rear section being substantially rigidly attached to said front section and including spaced frame members each including a wheel mounting hub, each hub independently supporting a pair of rear wheels on either side of the hub and;
   a rear suspension system comprising a forward attachment means for said hub pivotally mounted on said frame members to allow limited rotation of said hub about a longitudinal and a transverse axis relative to each frame member, and a vertically compliant suspension means limiting rotation of said hub about said transverse axis,
   wherein said suspension means being rigidly attached to each of said frame members to prevent lateral movement of said hub in a transverse plane relative to said frame members and being actively coupled to said hub in a manner which allows longitudinal movement of said hub relative to said suspension means as the hub rotates about said transverse axis and to permit rotation of said hub about said longitudinal axis.

2. The system of claim 1, wherein said main frame forward section is narrow and extends between said front wheels, said rear section being wider than said front section, said spaced frame members including elongate frame portions which extend gradually inwardly from said wider rear section to said narrower front section such that the transition between said front and rear sections is gradual rather than abrupt.

3. The system of claim 1 wherein said forward attachment means is pivotally mounted on mounting means extending laterally outwardly from said frame members, said main frame further comprising a cross member extending between said spaced frame members and substantially rigidly secured thereto to increase the rigidity of said rear frame section in the region of said mounting means for said forward attachment means.

4. The system of claim 3, wherein said cross member comprises a shaft passing through portions of said frame numbers and having end portions extending laterally outwardly from said frame members to provide said mounting means for said forward attachment means.

5. The system of claim 4, wherein said forward attachment member is received within one journal of a pivotal mounting having a further journal extending transversely to said one journal, said transverse journal receiving said shaft end portions.

6. The system of claim 1 wherein said forward attachment member is substantially hollow to convey cooling air to drive motors supported by said rear wheel mounting hub.

7. The system of claim 1 wherein said suspension means is actively coupled to said hub by a rearward extension from said hub received within a slidable bearing means carried by said suspension means, said slidable bearing means allowing said longitudinal movement of said hub and rotation of said hub about said longitudinal axis.

8. The system of claim 1, wherein said suspension means is carried by a rigid support member which is rigidly attached to said frame member, said support member having downwardly extending flange means positioned to be engaged by an abutment formed on said hub to limit transverse rotation of said hubs.

9. A large vehicle comprising a suspension system as claimed in claim 1, a substantially rigid load supporting body, means for pivotally mounting said body with respect to said main frame, and means for maintaining transverse spacing between said rear wheel pairs.

10. The vehicle of claim 9, wherein said body is pivotally mounted on said main frame such that pivotal movement of said body is about an axis which lies within the profile of the rear wheel pairs.

11. The vehicle of claim 9, wherein said body is supported only at said pivotal mountings on said main frame and at not more than two points near the front of the body and lying close to a line between the centers of the front wheels of the frame.

12. The vehicle of claim 9, further comprising hydraulic cylinders used to tip the body about its pivotal mountings, said hydraulic cylinders being mounted at points which are close to a line between the centers of the front wheels of the vehicle.

13. A very large rear dumping vehicle with a load carrying body, comprising:
   a vehicle;
   a very large rear dumping load carrying body comprising a floor reinforced by longitudinally extending strengthening beams, side walls and an end wall defining a load carrying region, wherein said very large rear dumping load carrying body is always supported on said vehicle only at transversely spaced pivoting rear supports and transversely spaced forward support points, said forward support points disposed in the proximity of said end wall, and wherein no transverse beams, are provided on the underside of the floor of the body between the rear supports and the forward support points.

14. The load carrying body of claim 13 wherein the transversely spaced forward support points are at a front of the load carrying region of the body.

15. The load carrying body of claim 13 wherein the transversely spaced rear support points form a pivot attachment means for pivoting the body with respect to the vehicle.

16. The load carrying body of claim 13 wherein the transversely spaced rear support points of said body on said truck are between or above rear wheels of the truck.

17. The load carrying body of claim 13 further including a transverse strengthening beam integrally formed with the transversely spaced rear support points.

18. The load carrying body of claim 13 wherein said floor slopes downwardly in a forward longitudinal direction of said body, said side walls sloping inwardly towards said floor and said floor increasing in width towards a rear longitudinal direction of said body.

19. The load carrying body of any one of claims 13 to 18 wherein the transversely spaced forward support points of said body on said truck are between front wheels of the truck.

20. The load carrying body of any one of claims 14 to 17 wherein said floor slopes downwardly in a forward longitudinal direction of said body, said side walls sloping inwardly towards said floor and said floor increasing in width towards a rear longitudinal direction of said body.

21. The load carrying body of any one of claims 14, 15, 17 or 18 wherein the transversely spaced rear support points of said body on said truck are between or above rear wheels of the truck.

22. The load carrying body of any one of claims 14, 15, 16 or 18 further including a transverse strengthening beam integrally formed with the transversely spaced rear support points.

23. The load carrying body of any one of claims 14, 16 to 18 wherein the transversely spaced rear support points form a pivot attachment means for pivoting the body with respect to the vehicle.

24. The load carrying body of any one of claims 15 to 18 wherein the transversely spaced forward support points are at a front of the load carrying region of the body.

25. A very large vehicle, comprising:
 a main frame which includes longitudinally extending spaced frame members, and having a forward section carrying front wheels and a transverse member extending between the forward section of the spaced frame members and substantially secured thereto and a rear section carrying rear wheels;
 a load carrying body including (a) a floor reinforced by strengthening beams such that a majority of said strengthening beams extend longitudinally of said body, (b) side walls and (c) an end wall defining a load carrying region; and
 wherein said body is always supported by said main frame only at transversely spaced rear support points mounted on said spaced frame members and at transversely spaced forward support points bearing on said spaced frame members at or near points of securement of the transverse member to said spaced frame members;
 wherein there are no transverse beams provided on the underside of the body between the rear support points and the forward support points.

26. The load carrying body of claim 25 wherein the transversely spaced forward support points are at a front of the load carrying region of the body.

27. The load carrying body of claim 25 further including a transverse strengthening beam integrally formed with said transversely spaced rear support points.

28. The load carrying body according to claim 25 wherein the transversely spaced rear support points allow pivotal movement of said body about said main frame to empty a load from the body.

29. The load carrying body according to claim 25 wherein the transversely spaced rear support points of said body on said truck are between or above the rear wheels of the truck.

30. The load carrying body according to claim 25 wherein said floor slopes downwardly in a forward longitudinal direction of said body, said side walls sloping inwardly towards said floor and said floor increasing in width towards a rear longitudinal direction of said body.

31. The load carrying body of any one of claims 25 to 30 wherein the transversely spaced forward support points bear on the spaced frame members at points between the front wheels.

32. The load carrying body according to any one of claims 26 or 28 to 30 further including a transverse strengthening beam integrally formed with said transversely spaced rear support points.

33. A load carrying body according to any one of claims 26, 27, 29 or 30 wherein the transversely spaced rear support points allow pivotal movement of said body about said main frame to empty a load from the body.

34. A load carrying body according to any one of claims 27, 28 or 29 wherein the transversely spaced forward support points are at a front of the load carrying region of the body.

35. A load carrying body according to any one of claims 26, 27 or 28 wherein the transversely spaced rear support points of said body on said truck are between or above the rear wheels of the truck.

36. A load carrying body according to any one of claims 26, 27 or 28 wherein said floor slopes downwardly in a forward longitudinal direction of said body, said side walls sloping inwardly towards said floor and said floor increasing in width towards a rear longitudinal direction of said body.

37. A large vehicle comprising:
 a substantially rigid main frame including:
  (1) longitudinally extending spaced frame members having,
   (a) a forward section carrying front wheels, a transverse member extends between the spaced frame members and is substantially secured thereto, and
   (b) a rear section carrying rear wheels, and
  (2) a body including,
   (i) a floor reinforced by strengthening beams such that a majority of said strengthening beams extend longitudinally of said body,
   (ii) side walls, and
   (iii) an end wall defining a load carrying region,
 wherein said body is always supported by said main frame only at transversely spaced rear support points mounted on said spaced frame members and transversely spaced forward support points bearing on said main frame at or near the points of securement of the transverse member to said spaced frame members, wherein no transverse beams, under the floor of the body between the rear support points and the forward support points, are provided.

38. The large vehicle of claim 37 wherein the transversely spaced forward support points for the body are at a front of the load carrying region of the body.

39. The large vehicle of claim 37 further including a transverse strengthening beam under the body integrally formed with said transversely spaced rear support points.

40. The large vehicle according to claim 37 wherein the transversely spaced rear support points allow pivotal movement of said body about said main frame to empty a load from the body.

41. The large vehicle according to claim 37 wherein the transversely spaced rear support points of said body on said truck are between or above the rear wheels of the truck.

42. The large vehicle according to claim 37 wherein said floor slopes downwardly in a forward longitudinal direction of said body, said side walls sloping inwardly towards said floor and said floor increasing in width towards a rear longitudinal direction of said body.

43. The large vehicle according to any one of the claims 37 to 39 wherein the transversely spaced forward support points bear on the space frame members at points between the front wheels.

44. The large vehicle according to claims 38, 40, 41 or 42 further including a transverse strengthening beam integrally formed with said transversely spaced rear support points.

45. The large vehicle according to claims 38, 39, 41 or 42 wherein the transversely spaced rear support points allow pivotal movement of said body about said main frame to empty a load from the body.

46. The large vehicle according to any one of claims 38 to 41 wherein said floor slopes downwardly in a forward longitudinal direction of said body, said side walls sloping inwardly towards said floor and said floor increasing in width towards a rear longitudinal direction of said body.

47. The large vehicle according to any one of claims 38, 39, 40 or 42 wherein the transversely spaced rear support points of said body on said truck are between or above the rear wheels of the truck.

48. The large vehicle according to any one of claims 39 to 42 wherein the transversely spaced forward support points for the body are at the front of the load carrying region of the body.

* * * * *